United States Patent
Sanders

(10) Patent No.: US 6,871,172 B1
(45) Date of Patent: Mar. 22, 2005

(54) METHOD AND APPARATUS FOR DETERMINING POWER DISSIPATION

(75) Inventor: Lester Sanders, Albuquerque, NM (US)

(73) Assignee: Xilinx, Inc., San Jose, CA (US)

( * ) Notice: Subject to any disclaimer, the term of this patent is extended or adjusted under 35 U.S.C. 154(b) by 790 days.

(21) Appl. No.: 09/767,323

(22) Filed: Jan. 22, 2001

(51) Int. Cl.[7] .............................................. G06F 17/50
(52) U.S. Cl. ............................. 703/14; 703/2; 703/18; 703/22; 716/2; 716/4
(58) Field of Search ................................ 703/2, 13–22; 716/1–18

(56) References Cited

U.S. PATENT DOCUMENTS

| | | | |
|---|---|---|---|
| 5,696,694 A | * 12/1997 | Khouja et al. ................. | 716/5 |
| 5,838,947 A | * 11/1998 | Sarin ........................... | 703/14 |
| 6,397,170 B1 | * 5/2002 | Dean et al. .................... | 703/14 |
| 6,493,863 B1 | * 12/2002 | Hamada et al. ................ | 716/18 |

OTHER PUBLICATIONS

Rodnunsky et al, "Power Estimation of CMOS Circuits via Power Software," IEEE Canadian Conference on Electrical and Computer Engineering, vol. 1, pp. 149–152 (May 1998).*

Marcii et al, "Power Consumption of Static and Dynamic CMOS Circuits: A Comparative Study," IEEE 2nd International Conference on ASIC, pp. 425–427 (Oct. 1996).*

Eisenmann et al, "Power Calculation for High Density CMOS Gate Array's," IEEE Euro ASIC '91, pp. 198–203 (May 1991).*

* cited by examiner

*Primary Examiner*—Samuel Broda
(74) *Attorney, Agent, or Firm*—W. Eric Webostad; Edel M. Young; Justin Liu

(57) ABSTRACT

Method and apparatus for determining power dissipation for an integrated circuit using computer simulation is described. More particularly, the integrated circuit is divided into cells, and one or more nodes are identified within each of the cells. A capacitive load value is ascribed to each of the nodes, and code is generated to track charges in state of each of the nodes. A total for changes in state for each node is divided by simulation time to determine a switching frequency. Using switching frequency, capacitive load and source voltage, dynamic power dissipation for each node may be determined. By summing dynamic power dissipation for all said nodes, total dynamic power dissipation may be determined.

21 Claims, 3 Drawing Sheets

METHOD AND APPARATUS FOR DETERMINING POWER DISSIPATION

FIELD OF THE INVENTION

The invention relates generally to determining power dissipation of a circuit, and more particularly to determining power dissipation of an integrated circuit using computer simulation.

BACKGROUND OF THE INVENTION

Knowing how much power an integrated circuit consumes or dissipates is important information to a designer. Knowing power dissipation of an integrated circuit facilitates doing power budgeting tasks, such as package selection, power supply selection, fan or intercooler selection, and the like. Moreover, as some devices, such as computers, have power consumption and heat dissipation limitations, knowing power dissipation of an integrated circuit is important to system design.

Conventionally, programmable logic device (PLD) (e.g., field-programmable gate array (FPGA), complex programmable logic device (CPLD), and the like) and application specific integrated circuit (ASIC) suppliers provide power estimators. For example, heretofore, Xilinx, Inc. of San Jose, Calif., provided a power estimator with their CPLDs. These power estimators necessitate a user having to provide an activity factor for each node under consideration. These activity factors are loaded into a spreadsheet for calculating power dissipation. Accordingly, it should be appreciated that many integrated circuits have millions of such nodes, and identifying each node and supplying an associated activity factor would be cumbersome and conventionally is not done.

For example, conventionally ASICS are supplied with power dissipation estimation equations with an activity factor estimate for switching of nodes internal to such ASICs. An activity factor estimate may be approximately ten percent (10%) of system clock frequency. Hence, if actual activity of such a node is twenty percent (20%) of system clock frequency, an error of one hundred percent (100%) occurs with respect to the frequency component of the following power dissipation equation for the dynamic power portion, $P_D$, $$P_D = f^*(V_{DD})2^*C_L \tag{1}$$

where f is an activity factor or switching frequency, $V_{DD}$ is source voltage, and $C_L$ is capacitive load. As is well known, power dissipated equals the sum of static power dissipated plus dynamic power dissipated.

Furthermore, because integrated circuits have so many elements and these elements are formed using submicron technologies, it is problematic to probe each node under operation to determine respective switching frequencies. Moreover, such probing would need to be accomplished without affecting operation. Therefore, users may not have an accurate switching frequency to plug into such a spreadsheet for calculating power dissipation for like follow-on designs.

Computers are used both to design circuits and to simulate circuit behavior. Special languages and simulators, such as Verilog and VHSIC Hardware Description Language (VHDL), are used to describe and simulate circuits, including both elements and signals. Using such logic simulation languages, code may be written to simulate stimulus to a device. For example, an integrated circuit may be designed on a computer, and a "testbench", namely code written to provide stimulus to a device under test, may be employed to simulate application of signals to such a simulated integrated circuit. A "testbench" comprises signal generating code for application to a simulated integrated circuit.

Accordingly, it would be desirable to use a computer simulation to determine switching frequencies at one or more nodes of a circuit to provide a more accurate method for determining power dissipation. Moreover, such simulated results could be compared against probing of an actual device for comparison.

SUMMARY OF THE INVENTION

An aspect of the present invention is a method for simulating operation of at least a portion of an integrated circuit for determining dynamic power dissipation associated therewith. Moreover, the integrated circuit is divided into at least one cell. At least one node associated with the one cell is identified, and parameters other than frequency for a dynamic power dissipation calculation for the at least one node are provided. Operation of the at least one cell is simulated, and transitions of the at least one node are counted to provide the number of transitions. The number of transitions is divided by a simulation time to obtain the frequency, and the dynamic power dissipated for the at least one node is calculated.

Another aspect of the present invention is using a general-purpose computer programmed with a simulator and having a model of an integrated circuit and signal generating code. Power dissipation code is generated and used to annotate the model or the signal generating code.

Another aspect of the present invention is a signal-bearing medium containing a simulation program which, when executed by a processor in response to receiving an integrated circuit model and power characteristic data, causes execution of a method. The method comprises generating power dissipation code and using the power dissipation code to annotate the model or a testbench.

The above as well as additional aspects of the present invention will become apparent in the following detailed written description.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE DRAWINGS

Figure 1:
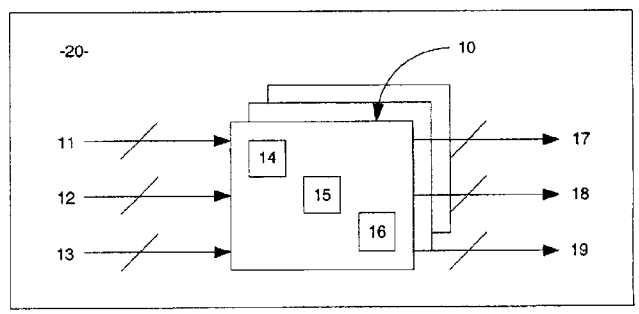
FIG. 1 is a block diagram of an exemplary embodiment of a cell in accordance with an aspect of the present invention.

Referring to FIG. 1, there is shown a block diagram of an exemplary embodiment of a "macrocell" or cell 10 in accordance with an aspect of the present invention. In accordance with an aspect of the present invention, dynamic power is determined by monitoring transitions for each cell 10 of a simulated integrated circuit 20. By cell, it is meant a portion of an integrated circuit. Cells 10 may be defined as logical portions of integrated circuit 20. By way of example and not limitation, if integrated circuit 20 is an FPGA, a cell may comprise a configurable logic block, an input/output logic block, or the like. However, a cell may comprise a circuit function, including but not limited to a counter, an adder, a shift register, and a clock, among other well-known circuits.

A cell 10 may have one or more clock inputs 11, one or more data inputs 12, and one or more control signal inputs 13, and a cell 10 may have one or more clock outputs 17, one or more data outputs 18, and one or more control signal outputs 19. Cells 10 are coupled to one another to form at least a portion of a simulated integrated circuit 20. Thus, cell 10 comprises a plurality of circuit elements.

Accordingly, for purposes of clarity, a cell 10, as used below, is described in terms of a "macrocell." By "macrocell," it is meant a component of a CPLD that contains sequential circuitry, such as one or more flip-flops and Input/Output (I/O) circuitry. Conventionally, CPLDs comprise two or more logic blocks, each comprising approximately sixteen to twenty macrocells. Conventionally, each macrocell circuit is the same as each other macrocell circuit, except for "buried macrocells." By "buried macrocell," it is meant a macrocell not accessible by a user. Each buried macrocell is like each other buried macrocell.

In the embodiment illustratively shown in FIG. 1, cell 10 comprises boxes 14 through 16 representing one or more clock nodes, one or more data nodes, and one or more combinatorial logic nodes, respectively. Cell 10 may comprise all or some portion of nodes 14 through 16.

Figures 2A, 2B:
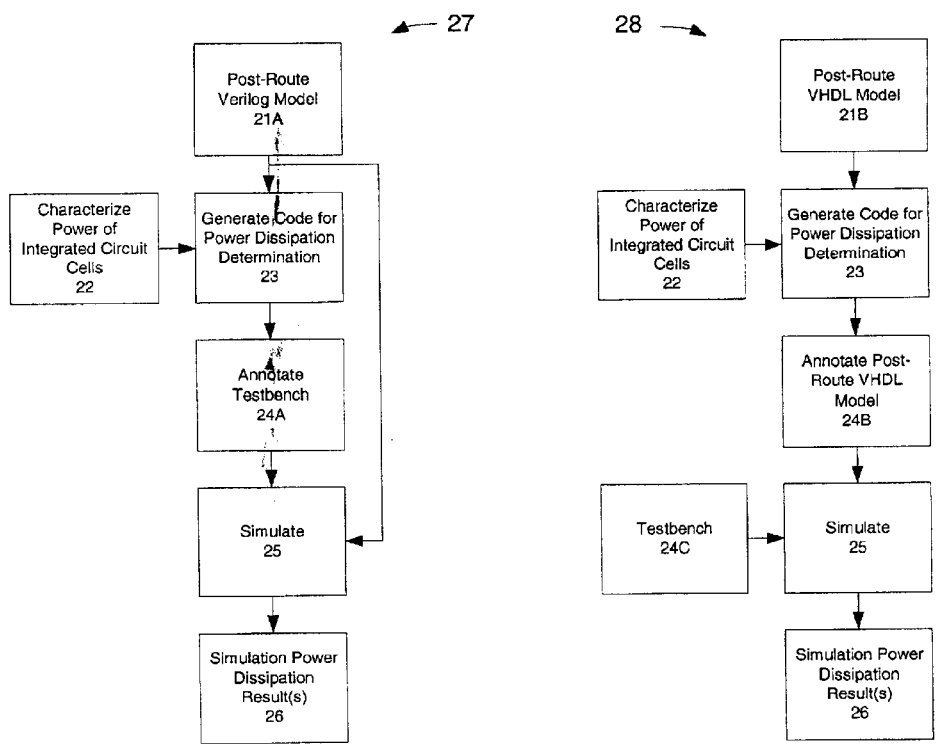
FIGS. 2A and 2B are flow diagrams of exemplary embodiments of process flows in accordance with aspects of the present invention.

Referring to FIG. 2A, there is shown a flow diagram of an exemplary embodiment of a process flow 27 in accordance with an aspect of the present invention. With continuing reference to FIG. 2A and additional reference to FIG. 1, process flow 27 is described.

At step 21A, a post-routing Verilog-based model of an integrated circuit 20 is provided. This model is provided to a simulator at step 25 for simulating operation of integrated circuit 20. Such a simulator may be a general-purpose, computer programmed to process a Verilog-based integrated circuit. This model is also provided to a code generator at step 23.

At step 22, a characterization of power of cells 10 of integrated circuit 20 is made. This characterization involves identifying cells 10 within integrated circuit 20. By way of example, a counter may be identified as a cell 10 or unit under test (UUT). It should be understood that once a user identifies how integrated circuit 20 is divided into cells, which may or may not take into account all gates of integrated circuit 20, at least one node may be identified as associated with each of those cells identified.

Additionally, this characterization further involves supplying a standby current value, a source voltage value, and supplying capacitive load values for elements of integrated circuit 20. Such elements may include but are not limited to flip-flops, combinatorial logic elements, and clocks, among other well-known elements. Capacitive load values may be determined in a well-known manner using circuit layout areas and spacing information on constituent parts of circuit elements as well as dielectric constant values for materials used. Such capacitive load values may take into account parasitic capacitance obtained from layout information and dielectric constants of materials employed. Alternatively, capacitive load values may be obtained from an integrated circuit manufacturer or supplier.

Additional information supplied at step 22 may include clock frequency, simulation run time, periodicity for calculating power, and timing points/reset values. Alternatively, default values for one or more of clock frequency, simulation run time, periodicity for calculating dynamic power, and timing points/reset values may be used. Moreover, a combination of user supplied and default values may be used.

At step 23, a model obtained from step 21A and information obtained from step 22 are used to generate code for a power dissipation calculation. As one or more integrated circuit cells 10 are identified with respect to integrated circuit 20 described by such a Verilog-based model, one or more nodes 14 through 16 are identified within each of those cells. Capacitive load associated with one or more elements within such cells are ascribed to at least one node within such cells. More particularly, clock capacitive load is ascribed to a clock node 14, data capacitive load is ascribed to a data node 15, and combinatorial logic capacitive load is ascribed to a combinatorial node 16. In other words, one or more circuits within a cell 10 are broken down into representative nodes, which comprise at least one of nodes 14 through 16. By way of example, a cell 10 may comprise a data flip-flop, a toggle flip-flop, combinatorial logic, and a clock circuit. A data node of a cell 10 is selected to bypass a flip-flop for combinatorial functions.

Thus, nodes used to determine power dissipation are defined in a simulation model. This simulation model, which may be in a Verilog or VHDL file, defines logic circuits in terms of clock, data (D) flip-flop input, toggle (T) flip-flop input, and combinatorial circuitry.

Figure 3:
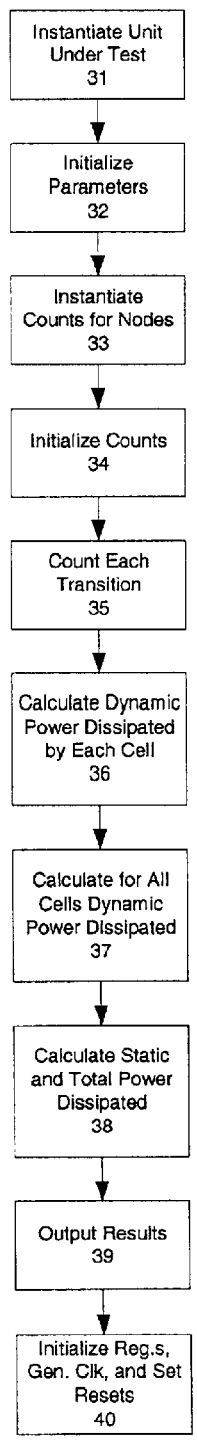
FIG. 3 is a flow diagram of an exemplary embodiment of power dissipation code in accordance with an aspect of the present invention.

Referring to FIG. 3, there is shown a flow diagram of an exemplary embodiment of power dissipation code 30 generated at step 23 of FIG. 2A in accordance with an aspect of the present invention. Code 30 is generated to: (i) declare (instantiate) and initialize signals used in power dissipation calculations; (ii) calculate transitions on clock, data, and combinatorial signals; (iii) sum total power dissipated; and (iv) determine a location in a testbench (Verilog) (or model (VHDL)) to place each section of code. Though code 30 is generated for subsequent use, and thus steps 31 through 39 may be described as generating code to do a specified task, steps 31 through 39 are described in terms of generation and execution of code 30 for purposes of clarity.

A step 31, a UUT is initialized and instantiated. Continuing the above-example, for a UUT that is a four-bit counter, reset and clock registers may be initialized as inputs and counts count_0, count_1, count_2, count_3 may be monitored as outputs.

At step 32, parameter information (i.e. information associated with power dissipation) obtained at step 22 is initialized. Continuing the above-example of a four-bit counter, such a counter may use a toggle flip-flop. Accordingly, capacitive load ("cl") values for such a toggle flip-flop ("cl_T") and the clock input ("cl_C") are initialized, along with source standby current ($I_{DDSB}$), source voltage ($V_{DD}$), and simulation time ("simtime") obtained from step 22 of FIG. 2A.

At step 33, counts for nodes are declared. More particularly, states for each of the nodes are identified, and transitions from one state to another are counted. Continuing the above-example of a four-bit counter, transitions ("trans")

and dynamic power ("dp") count variables are declared. For example, for count or output count_0, we may have variables declared for toggle flip-flop and clock nodes as, real trans_count_0_T;

real dp_count_0_T;

real trans_count_0_C; and real dp_count_0_C.

This code is repeated for all remaining transition and dynamic power count variables, namely remaining counts count_1, count_2, and count_3 of a four-bit counter.

At step 34, counts are initialized to a starting value. Continuing the above-example of a four-bit counter, all transition and dynamic power count variables are set equal to zero for each node (T and C) and for each transition count (count_0 to count_3) thereof.

At step 35, each transition is counted to determine switching frequency. Continuing the above-example of a four bit counter, each count_0, count_1, count_2, and count_3 type outputs are counted. Moreover, it may be specified where to count to obtain a more accurate count. By way of example, for the toggle flip-flop 0 output transitions, they may be counted by specifying counting at each positive edge transition as, always @(posedge d.count_0_T)

begin trans_count_0_T=trans_count_0_T+1;

end, where d is for an instantiated device or UUT. Such counting would go on for each node (T and C) and for each output transition (count_0 to count_3) thereof.

At step 36, dynamic power dissipated by each cell is calculated. Continuing the above-example of a four-bit counter, dynamic power dissipated may be determined using Equation (1) above for each transition count. By way of example, dynamic power dissipated for output transitions for count_0 of the toggle flip-flop may be calculated as, $$dp\_count\_0\_T=(trans\_count\_0\_T/simtime *cl\_T*(V_{DD}*V_{DD})).$$

Such equation is done for each node (T and C) and for each output transition (count_0 to count_3) thereof, and such calculations may be done at the completion of a simulation or during a simulation. As mentioned above, a periodicity for calculating dynamic power may be specified. Notably, the frequency component of Equation (1) is determined by dividing switching or transition count by simulation time. Simulation time ("simtime") may be determined by sampling time. By way of example, if total simulation time is 600 nanoseconds (ns) and sampling is done every 200 ns, then simtimes for such a simulation will be 200, 400, and 600 ns.

At step 37, total dynamic power dissipated is calculated for all cells. Continuing the above-example of a four-bit counter, total dynamic power dissipated may be calculated as, dynamic_power=dp_count_T+dp_count_0_C +dp_count_1_T+dp_count_1_C +dp_count_2_T+dp_count_2_C +dp_count_3_T+dp_count_3_C.

Of course, this is a subtotal of dynamic power dissipated when integrated circuit 20 (shown in FIG. 1) comprises more cells than this four-bit counter cell. Again, notably, such calculations may be done at the completion of a simulation or during a simulation. As mentioned above a periodicity for calculating dynamic power may be specified.

Accordingly, at step 38, dynamic power totals for each cell 10 (shown in FIG. 1) are obtained from step 37 and combined to determine total dynamic power dissipated for integrated circuit 20 (shown in FIG. 1). This total dynamic power dissipated is summed with static power, static_power=$I_{DDSB}*V_{DD}$ to provide total power dissipated by integrated circuit 20 (shown in FIG. 1).

At step 39, results for power dissipation are outputted. These results may include one or more of the following total power dissipated, total dynamic power dissipated, static power dissipated, total dynamic power dissipated for one or more cells, total dynamic power dissipated for a node, and total dynamic power dissipated for a transition of a node.

At step 40, code is generated to initialize register values, to generate a clock, and to provide timed resets. Step 40 is conventional for running a simulation. As mentioned above, clock frequency and timing points/reset values may be user specified or default values or some combination thereof. Continuing the above-example of a four-bit counter, additional code is generated to initialize reset and clock registers to equal zero, to generate a clock signal to the device, and to indicated timing point in which to set the reset register to one or zero.

Referring again to FIG. 2A, at step 24A, a testbench generator generates or annotates a test bench using in part code 30 generated at step 23. Accordingly, a testbench annotated with code 30 is provided, namely an annotated testbench is provided. In this embodiment, a Verilog annotated testbench is provided. Sections of code 30 are placed at locations in such a Verilog testbench according to Verilog language syntax and rules used by Verilog simulators used in reading Verilog files.

At step 25, this annotated testbench is provided to a simulator for testing integrated circuit 20 obtained from step 21A. A simulation is run at step 25 using such an annotated testbench to generate power dissipation information. At step 26, power dissipation results obtained from testing at step 25 may be outputted along with other simulation results. Code obtained from code 30 may be used for outputting power dissipation results.

Referring now to FIG. 2B, there is shown a flow diagram of an exemplary embodiment of a process flow 28 in accordance with an aspect of the present invention. Process flow 27 is similar to process flow 27 of FIG. 2A, except FIG. 2B is a process flow for an exemplary embodiment using VHDL. With continuing reference to FIG. 2B and renewed reference to FIGS. 1 and 2A, process flow 28 is described.

At step 21B, a post-route VHDL model of integrated circuit 20 is provided. This model is provided to a code generator at step 23.

At step 22, a characterization of power of cells 10 of integrated circuit 20 is made. Using this characterization and the post-route VHDL model obtained from step 21B power dissipation code 30 (shown in FIG. 3) is generated. Steps 22 and 23 are the same as those previously described with respect to FIG. 2A, except VHDL code is generated.

Currently, VHDL does not support probing of internal signals. Accordingly, at step 24B, VHDL code 30 is written to the post-route VHDL model obtained from step 21B, and thus a created or annotated post-route VHDL model is provided. Sections of code 30 are placed at locations in such a post-route VHDL model according to Verilog language syntax and rules used by Verilog simulators used in reading Verilog files.

At step 24C, a testbench generator provides a testbench. In this embodiment, a VHDL testbench is provided as compared with the Verilog testbench of step 24A of FIG. 2A. At step 25, the created or annotated post-route VHDL model obtained from step 24B and the VHDL testbench obtained from step 24C are used to simulate and test integrated circuit 20 by a simulator. Such a simulator may be a general-purpose computer programmed for VHDL simulation. Step 26 is the same as previously described.

Figure 4:
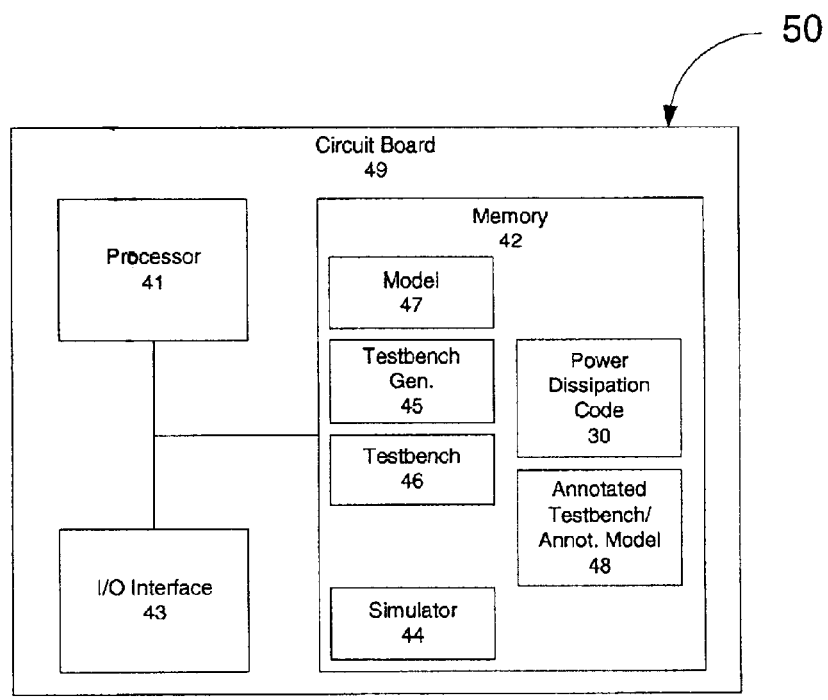
FIG. 4 is a block diagram depicting an exemplary embodiment of a general-purpose computer comprising signal bearing media containing at least a portion of power dissipation code of FIG. 3 in accordance with an aspect of the present invention.

FIG. 4 is a block diagram depicting an exemplary embodiment of a general-purpose computer 50 comprising signal bearing media, which for purposes of clarity is shown as memory 42 containing at least a portion of power dissipation code 30 of FIG. 3 in accordance with an aspect of the present invention. Memory 42 may be operatively coupled to processor 41 and to I/O interface 43 via circuit board 49. Memory 42 comprises at least a portion of one or more of simulator 44, integrated circuit model 47, testbench generator 45, testbench 46, and annotated testbench or annotated model 48. General-purpose computer is programmed for simulating integrated circuit 20 (shown in FIG. 1) and is programmed with an operating system (not shown), which may be OS/2, Java virtual Machine, Linux, Solaris, Unix, Windows, Windows95, Windows98, Windows NT, and Windows2000, among other known platforms and like platforms.

At least a portion of code 30 for providing a program product comprises functions of one or more aspects of the present invention and can be contained on a variety of signal-bearing media, which include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); (iii) integrated circuit memory, including but not limited to DRAM, SRAM, EEPROM, flash, and the like; or (iv) information conveyed to a computer by a communications medium, such as through a computer or telephone network, including wireless communications. The latter embodiment specifically includes information downloaded from the Internet and other networks. Such signal-bearing media 42, when carrying computer-readable instructions that direct the functions of the present invention, represent embodiments of the present invention.

Although various embodiments, which incorporate the teachings of the present invention, have been shown and described in detail herein, those skilled in the art can readily devise many other varied embodiments that still incorporate these teachings. Accordingly, it should be understood that though power dissipation has been illustratively shown as determined using VHDL and Verilog simulators respectively, other simulators may be used. Moreover, it should be understood that error associated with the frequency component of a dynamic power calculation is reduced as described herein. Furthermore, it should be understood that only power dissipation code is added to a testbench, and no additional calculations, design tools, value change dump (vcd) files, or power libraries are needed to determine power dissipation as described herein.

Xilinx is a trademark of Xilinx. All other trademarks are the property of their respective owners.

What is claimed is:

1. A method for simulating operation of at least a portion of an integrated circuit for determining dynamic power dissipation associated therewith, comprising:
dividing the integrated circuit into at least one cell;
identifying at least one node associated with the at least one cell;
providing parameters, other than frequency, for determining dynamic power dissipation of the at least one node;
simulating operation of the at least one cell;
counting transitions of the at least one node to provide an activity factor;
dividing the activity factor by sampling time, which is a fraction of simulation time, to obtain the frequency; and
calculating dynamic power dissipation for the at least one node.

2. The method of claim 1 wherein the at least one node is a clock node.

3. The method of claim 1 wherein the at least one node is a data node.

4. The method of claim 1 wherein the at least one node is a combinatorial logic node.

5. The method of claim 1 wherein the at least one node is a sequential circuitry node.

6. The method of claim 5 wherein the sequential circuitry node is a toggle flip-flop node.

7. The method of claim 1 wherein the integrated circuit is selected from a field programmable gate array (FPGA), an application specific integrated circuit (ASIC) and a complex programmable logic device (CPLD).

8. The method of claim 1 wherein the at least one cell is a macrocell.

9. The method of claim 1 wherein the dynamic power dissipated is calculated by multiplying a capacitive load associated with the at least one node by source voltage squared and by the frequency.

10. A method for determining dynamic power dissipation, comprising:
providing a general-purpose computer programmed with a simulator;
providing a model of an integrated circuit to the general-purpose computer;
providing signal generating code to the simulator;
providing power characteristic data, other than an activity factor, to the general-purpose computer;
generating power dissipation code using at least a portion of the model and the power characteristic data;
annotating the model using the power dissipation code to provide an annotated model;
providing the annotated model to the simulator;
simulating operation of the integrated circuit with the simulator in response to the annotated model and to the signal generating code; and
determining dynamic power dissipated by the integrated circuit under simulated operation using the annotated model.

11. The method of claim 10 wherein the model is a Very High Level Description Language (VHDL) model of the integrated circuit.

12. The method of claim 10 wherein the power dissipation code comprises determining the activity factor associated with a circuit element of the integrated circuit.

13. The method of claim 12 wherein the activity factor is divided by simulation time to provide frequency of operation of the circuit element.

14. A method of determining dynamic power dissipation for a model of an integrated circuit, comprising:
dividing at least a portion of the integrated circuit into a plurality of cells;
identifying nodes within each of the cells;

ascribing a capacitive load value to each node of the nodes;

declaring states for each of the nodes;

simulating operation of the integrated circuit;

counting transitions for each of the nodes when going from one of the states to another of the states; and determining dynamic power dissipated at each of the nodes;

wherein the dynamic power dissipated is determined prior to ending a simulation of the integrated circuit.

15. The method of claim 14 wherein the step of determining dynamic power dissipated comprises:

dividing a count from the step of counting transitions by a simulation time for each of the nodes to provide a switching frequency for each of the nodes; and multiplying the switching frequency for each of the nodes by square of a source voltage and by the capacitive load value of the node for each of the nodes.

16. The method of claim 15 further comprising summing the dynamic power dissipated for each of the nodes.

17. The method of claim 16 further comprising:

multiplying standby current by the source voltage to provide a product; and adding a sum from the step of summing to the product.

18. A method for determining dynamic power dissipation, comprising:

providing a general-purpose computer programmed with a simulator;

providing a model of an integrated circuit to the simulator;

providing signal generating code;

providing power characteristic data, other than an activity factor, to the general-purpose computer;

generating power dissipation code using a portion of the model and the power characteristic data;

annotating the signal generating code using the power dissipation code to provide annotated signal generating code;

providing the annotated signal generating code to the simulator;

simulating operation of the integrated circuit with the simulator in response to the model and to the annotated signal generating code; and determining dynamic power dissipated by the integrated circuit under simulated operation using the annotated signal generating code.

19. The method of claim 18 wherein the model is a Verilog model of the integrated circuit.

20. The method of claim 18 wherein the power dissipation code comprises determining the activity factor associated with a circuit element of the integrated circuit.

21. The method of claim 20 wherein the activity factor is divided by simulation time to provide frequency of operation of the circuit element.

\* \* \* \* \*